(12) United States Patent
Nieman

(10) Patent No.: US 12,353,629 B2
(45) Date of Patent: Jul. 8, 2025

(54) VIRTUAL REALITY GLOVE

(71) Applicant: Jonathan P. Nieman, Port Charlotte, FL (US)

(72) Inventor: Jonathan P. Nieman, Port Charlotte, FL (US)

(*) Notice: Subject to any disclaimer, the term of this patent is extended or adjusted under 35 U.S.C. 154(b) by 0 days.

(21) Appl. No.: 18/442,821

(22) Filed: Feb. 15, 2024

(65) Prior Publication Data

US 2024/0184373 A1 Jun. 6, 2024

Related U.S. Application Data

(63) Continuation of application No. 18/121,928, filed on Mar. 15, 2023, now Pat. No. 11,907,429, which is a continuation of application No. 17/544,123, filed on Dec. 7, 2021, now Pat. No. 11,609,636.

(60) Provisional application No. 63/125,151, filed on Dec. 14, 2020.

(51) Int. Cl.
| | |
|---|---|
| *A61H 1/02* | (2006.01) |
| *G06F 3/01* | (2006.01) |
| *G06F 3/03* | (2006.01) |
| *G06F 3/0346* | (2013.01) |
| *G06T 19/00* | (2011.01) |
| *H04W 4/38* | (2018.01) |
| *H04W 4/80* | (2018.01) |

(52) U.S. Cl.
CPC ............. *G06F 3/016* (2013.01); *G06F 3/014* (2013.01); *G06F 3/03* (2013.01); *G06F 3/0346* (2013.01); *G06T 19/006* (2013.01); *H04W 4/38* (2018.02); *H04W 4/80* (2018.02)

(58) Field of Classification Search
CPC . G06F 3/016; G06F 3/014; G06F 3/03; G06F 3/0346; H04W 4/38; H04W 4/80; G06T 19/006; A61H 1/0285
USPC .......................................................... 901/34
See application file for complete search history.

(56) References Cited

U.S. PATENT DOCUMENTS

| | | | |
|---|---|---|---|
| 5,184,319 A * | 2/1993 | Kramer ................. | G06F 3/016 901/34 |
| 10,013,062 B1 | 7/2018 | Corson et al. | |
| 10,055,019 B2 | 8/2018 | Beran | |
| 10,296,086 B2 | 5/2019 | Rimon et al. | |
| 10,362,989 B2 | 7/2019 | McMillen et al. | |
| 10,372,213 B2 | 8/2019 | Keller et al. | |
| 10,474,236 B1 | 11/2019 | Stewart et al. | |
| 10,551,917 B2 | 2/2020 | Reese et al. | |
| 10,564,722 B2 | 2/2020 | Keller et al. | |
| 10,809,804 B2 | 10/2020 | Goupil et al. | |
| 10,894,204 B2 | 1/2021 | Buchanan et al. | |
| 2016/0274662 A1 | 9/2016 | Rimon et al. | |
| 2020/0159320 A1 | 5/2020 | Seth | |
| 2020/0345574 A1* | 11/2020 | Sankai ................. | A61H 1/0285 |

(Continued)

*Primary Examiner* — Abdul-Samad A Adediran
(74) *Attorney, Agent, or Firm* — NEO IP

(57) ABSTRACT

A system and apparatus for interacting with a virtual reality environment by means of a virtual reality glove comprising artificial muscles. A plurality of artificial muscles comprising individual artificial muscles operable to either expand or contract is embedded in or attached to a virtual reality glove. Individual artificial muscles are actuated in response to stimulus in the virtual reality environment such that a user wearing the virtual reality glove experiences resistance to virtual objects simulating a resistance the user would feel from a tangible object.

19 Claims, 9 Drawing Sheets

(56) References Cited

U.S. PATENT DOCUMENTS

2022/0187918 A1  6/2022  Nieman
2023/0221800 A1  7/2023  Nieman

* cited by examiner

VIRTUAL REALITY GLOVE

CROSS REFERENCES TO RELATED APPLICATIONS

This application is a continuation of U.S. patent application Ser. No. 18/121,928, filed Mar. 15, 2023, which is a continuation of U.S. patent application Ser. No. 17/544,123, filed Dec. 7, 2021, which claims priority to and the benefit of U.S. Provisional Application No. 63/125,151, filed Dec. 14, 2020, each of which is incorporated by reference in its entirety.

BACKGROUND OF THE INVENTION

1. Field of the Invention

The present invention relates to virtual reality gloves, and more specifically to virtual reality gloves that use artificial muscles to exert a force on a user's hand.

2. Description of the Prior Art

It is generally known in the prior art to provide haptic gloves and/or virtual reality systems that use vibration or a non-constricting method of creating a haptic effect.

Prior art patent documents include the following:

U.S. Pat. No. 10,809,804 for Haptic feedback glove by inventor Marc Y. Goupil et al., filed Dec. 28, 2018 and issued Oct. 20, 2020, is directed to a haptic feedback glove including an inner glove made of a flexible material, thimbles over each finger and thumb, and tendons coupled to each finger thimble. One or more actuators may be connected to each tendon, so that the tendons may be used to apply pressure to the fingers. Tactors in the finger thimbles and on palm panels may also be used to provide haptic feedback.

U.S. Pat. No. 10,894,204 for Exo tendon motion capture glove device with haptic grip response by inventor Thomas F. Buchanan et al., filed Jan. 31, 2018 and issued Jan. 19, 2021, is directed to motion capture and haptic glove systems/methods and devices. In one embodiment of the invention a motion capture and haptic glove system is described, comprising: A glove portion to be worn on top of a user's hand, the glove having finger portions for the fingers and thumb of the user; a plurality of anchoring finger caps circumscribed around the extremities of the finger portions; a plurality of anchor points configured to generate sensor data identifying a flexion/extension and an abduction/adduction of the finger portions; a plurality of tendon-like cables configured to transmit the flexion/extension and the abduction/adduction data to a plurality of measuring devices for processing, the tendon like cables being formatted to be flexible in their degree of movement; a plurality of motors to ensure constant tension in the tendon-like cable elements, wherein the plurality of motors also allow a pull back of the fingers and thumb based upon a virtual stimuli; and a housing structure residing on the forearm and connected to the glove portion via the plurality of tendon-like cables, wherein the housing unit comprises at least one motor unit and at least one routing system.

U.S. Pat. No. 10,013,062 for Fluid-actuated haptic feedback jamming device for movement restriction in haptic devices by inventor Nicholas Roy Corson et al., filed Jun. 9, 2017 and issued Jul. 3, 2018, is directed to a sheet jammer device comprising a first jamming sheet having a first surface within a compression region. A first inflatable bladder includes a first contact area within the compression region and a second jamming sheet has a surface within the compression. A second inflatable bladder that includes a second contact area that is within the compression region. An amount of inflation of the first inflatable bladder and the second inflatable bladder controls the first friction force and the second friction force to restrict movement of the first jamming sheet relative to the second jamming sheet.

U.S. Pat. No. 10,362,989 for Sensor system integrated with a glove by inventor Keith A. McMillen et al., filed Jun. 13, 2017 and issued Jul. 30, 2019, is directed to sensor systems that are designed to be integrated with gloves for the human hand. An array of sensors detects forces associated with action of a hand in the glove, and associated circuitry generates corresponding control information that may be used to control a wide variety of processes and devices.

U.S. Pat. No. 10,551,917 for Compliant multi-region angular displacement and strain sensors by inventor Shawn P. Reese et al., filed Feb. 21, 2017 and issued Feb. 4, 2020, is directed to an apparatus including a glove for a human hand, and a sensing network coupled to the glove. The sensing network includes a strand of compliant material with a center axis and a multi-region angular displacement sensor connected to the strand. The multi-region angular displacement sensor includes a first angular displacement unit in a first sense region of the stand. The first angular displacement unit is used to determine a first angular displacement in response to deformation of the first angular displacement unit by a first joint of the human hand. The multi-region angular displacement sensor also includes a second angular displacement unit disposed in a second sense region of the strand. The second angular displacement unit is used to determine a second angular displacement in response to deformation of the second angular displacement unit by a second joint of the human hand.

U.S. Pat. No. 10,372,213 for Composite ribbon in a virtual reality device by inventor Sean Jason Keller et al., filed Sep. 20, 2016 and issued Aug. 6, 2019 is directed to a haptic glove comprising a glove body including a glove digit corresponding to a phalange of a user hand. The glove digit has a first ribbon layer of a first average width and a second ribbon layer of a second average width greater than the first average width. The first and second ribbon layers are configured to be positioned on a first surface of the digit and formed lengthwise along a bend centerline of the glove digit that bisects a surface of the glove digit. A central axis of the second ribbon layer is aligned with a central axis of the first ribbon layer. The first ribbon layer comprises a first extendible material having a first range of elastic extensibility and the second ribbon layer comprises a second extendible material having a second range of elastic extensibility greater than the first range of elastic extensibility of the first ribbon layer.

U.S. Pat. No. 10,296,086 for Dynamic gloves to convey sense of touch and movement for virtual objects in HMD rendered environments by inventor Noam Rimon et al., filed Mar. 20, 2015 and issued May 21, 2019, is directed to a system and method of using a peripheral device for interfacing with a virtual reality scene generated by a computer for presentation on a head mounted display. The peripheral device includes a haptic device capable of being placed in contact with a user and a haptic feedback controller for processing instructions for outputting a haptic signal to the haptic device. The haptic feedback controller receiving the instructions from the computer so that haptic feedback of the haptic device changes to correspond to a user's virtual interactions with a virtual object in the virtual reality scene as presented on the head mounted display.

U.S. Pat. No. 10,055,019 for Electromagnet-laden glove for haptic pressure feedback by inventor Erik Beran, filed May 20, 2015 and issued Aug. 21, 2018, is directed to a glove interface object including: a plurality of magnetic objects positioned on a first side of the glove interface object; a plurality of electromagnets positioned on a second side of the glove interface object opposite the first side, the plurality of electromagnets being positioned substantially opposite the plurality of magnetic objects, wherein each electromagnet is configured when activated to attract one or more of the magnetic objects; a controller configured to control activation and deactivation of the electromagnets based on received haptic feedback data.

U.S. Pat. No. 10,474,236 for Haptic device for variable bending resistance by inventor Charles Stewart et al., filed Sep. 13, 2017 and issued Nov. 12, 2019, is directed to a haptic glove comprising a glove body including a glove digit corresponding to a phalange of a user hand with the glove digit having a bend location that is located along the glove digit. A haptic apparatus is coupled to the glove body at the bend location with the haptic apparatus comprising a plurality of sheets that are flexible and inextensible and a pressure actuator coupled to one or more of the plurality of sheets. The plurality of sheets are stacked and configured to translate relative to each other along the centerline with bending of the glove digit. The pressure actuator is configured to adjust an applied pressure to the plurality of sheets to adjust friction between the sheets. The adjustment of friction is proportional to a bending resistance of the glove digit.

U.S. Pat. No. 10,564,722 for Restricting user movement via connecting tendons in a garment to a jamming mechanism by inventor Sean Jason Keller et al., filed Oct. 4, 2016 and issued Feb. 18, 2020, is directed to an input interface configured to be worn on a portion of a user's body includes tendons coupled to various sections of the glove. A tendon includes one or more activation mechanisms that, when activated, prevent or restrict a particular range of motion. Additionally, a tendon may be coupled to a plate that is coupled to one or more additional tendon, so when an activation mechanism included in the tendon is activated, the one or more additional tendons coupled to the plate that are also coupled to the tendon move, stiffening the additional tendons as well as the tendon.

SUMMARY OF THE INVENTION

The present invention relates to virtual reality gloves, and more specifically to virtual reality gloves that use artificial muscles to exert a force on a user's hand.

It is an object of this invention to use artificial muscles rather than traditional actuators in a virtual reality glove to decrease the weight thereof. By decreasing the weight of the glove, users are able to wear the glove for longer before becoming tired. Users are furthermore able to become more immersed in the virtual reality environment if the weight of the virtual reality glove is not noticeable.

It is another object of this invention to use artificial muscles in a virtual reality glove to increase the dexterity thereof.

In one embodiment, the present invention includes a virtual reality (VR) glove including a power supply, at least one processor, at least one memory, and a plurality of artificial muscles, wherein each artificial muscle of the plurality of artificial muscles includes at least one sensor and at least one flexible sheet, wherein the at least one flexible sheet is a concave shape, wherein the at least one sensor includes a gyroscope, a magnetic field sensor, an acoustic sensor, a light emitting sensor, and/or a light reflecting sensor, wherein the plurality of artificial muscles are configured to increase stiffness or decrease stiffness, wherein the at least one processor is configured to receive at least one signal from at least one remote device, wherein the at least one processor is further configured to transmit a stimulus across the plurality of artificial muscles based on the at least one signal, wherein the plurality of artificial muscles are configured to expand or contract based on the stimulus, wherein a stiffness of the plurality of artificial muscles increases when contracted and the stiffness of the plurality of artificial muscles decreases when expanded, and wherein the VR glove is configured to push and/or pull on a back of a hand of a user, a finger of the user, a fingertip of the user, and/or a palm of the user.

In another embodiment, the present invention includes a virtual reality (VR) system including a virtual reality (VR) glove, and at least one remote device, wherein the VR glove includes a power supply including a rechargeable battery, at least one processor, at least one memory, at least one sensor, a plurality of twisted artificial muscles, wherein each twisted artificial muscle of the plurality of twisted artificial muscles include a fiber, wherein the fiber is twisted to create a coil, wherein the plurality of twisted artificial muscles further include a material including a degree of internal alignment, wherein the at least one remote device is configured to generate a virtual reality environment, wherein the VR glove and the at least one remote device are in network communication, wherein the VR glove is configured to transmit sensor data to the at least one remote device, wherein the VR glove corresponds to a hand of a virtual avatar in the virtual reality environment, wherein the at least one processor is configured to receive at least one activation signal from the at least one remote device, wherein the at least one processor is configured to transmit a stimulus to at least one twisted artificial muscle of the plurality of twisted artificial muscles based on the at least one activation signal, wherein the at least one activation signal corresponds to activity performed in the virtual reality environment, and wherein the hand of the virtual avatar is configured to match the movement of the at least one twisted artificial muscle of the plurality of twisted artificial muscles.

In yet another embodiment, the present invention included a virtual reality (VR) system including at least one remote device, a virtual reality environment, and a virtual reality (VR) glove, wherein the VR glove includes a power supply, at least one processor, and at least one memory, a plurality of artificial muscles, wherein each artificial muscle of the plurality of artificial muscles includes at least one sensor and at least one flexible sheet, a first scaffolding positioned on a palm side of the VR glove, a second scaffolding positioned on a back side of the VR glove, wherein the first scaffolding and the second scaffolding are configured to not move when the plurality of artificial muscles expand or contract, wherein the at least one flexible sheet is a concave shape, wherein the at least one sensor includes a gyroscope, a magnetic field sensor, an acoustic sensor, an light emitting sensor, and/or a light reflecting sensor, wherein the at least one sensor is configured to capture motion data, wherein the at least one sensor is configured to transmit the motion data to the at least one remote device, wherein the at least one remote device is configured to modify the virtual reality environment based on the motion data, wherein the at least one remote device is configured to transmit a first activation signal to the at least one processor based on the modification of the virtual reality environment, wherein the at least one processor is configured to apply a first stimulus to the plurality of artificial muscles based on the first activation signal, wherein the plurality of artificial muscles are configured to contract or expand based on the first stimulus, wherein the at least one remote device is configured to transmit a second activation signal based on the modification of the virtual reality environment, wherein the at least one processor is configured to apply a second stimulus to the plurality of artificial muscles based on the second activation signal, and wherein the plurality of artificial muscles are configured to return to a resting position based on the second stimulus.

These and other aspects of the present invention will become apparent to those skilled in the art after a reading of the following description of the preferred embodiment when considered with the drawings, as they support the claimed invention.

DETAILED DESCRIPTION

Figure 1:
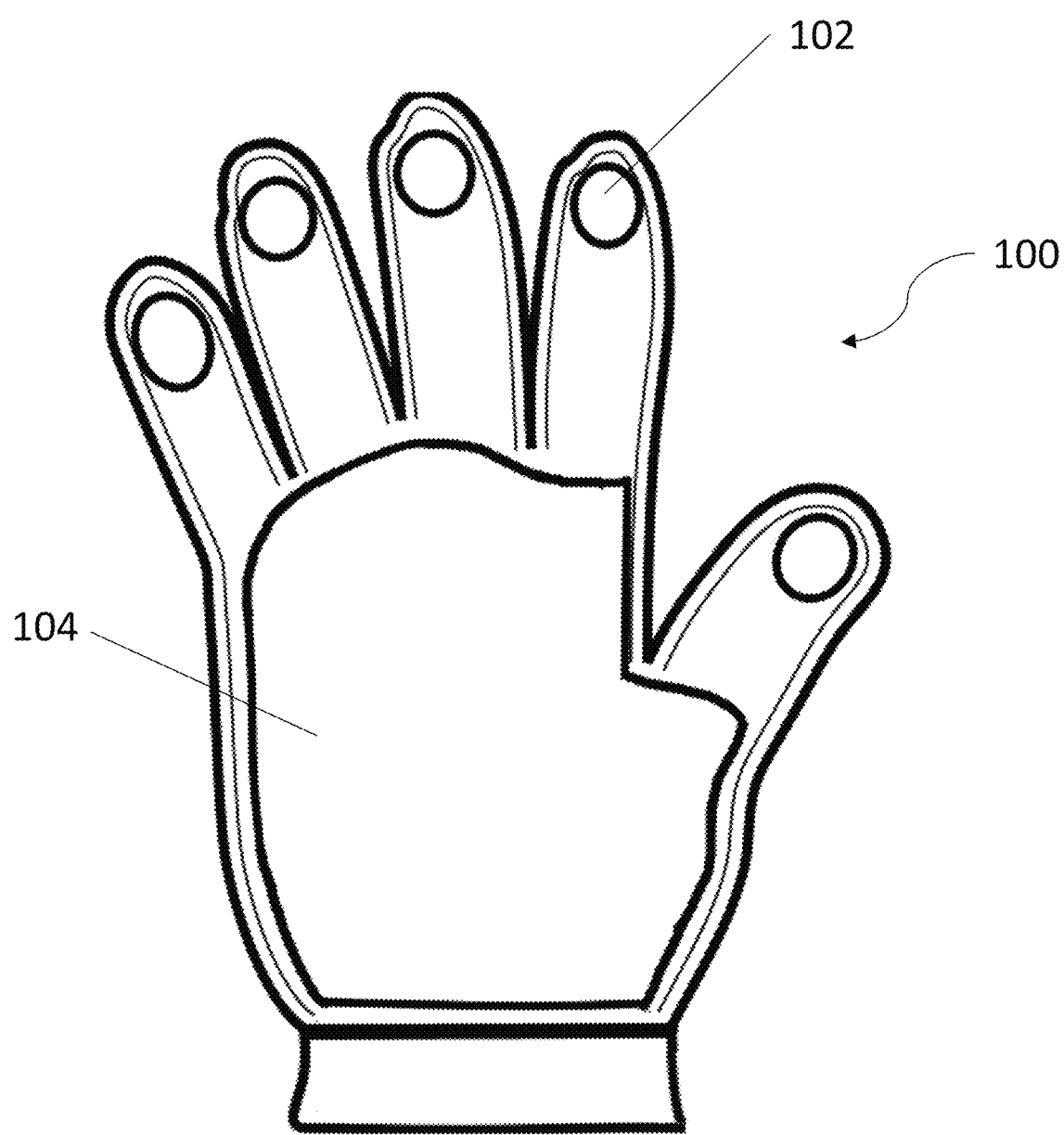
FIG. 1 illustrates a virtual reality glove according to one embodiment of the present invention.

The present invention is generally directed to a system and apparatus for interacting with a virtual reality and/or augmented reality environment by means of a virtual reality glove comprising artificial muscles. A plurality of artificial muscles comprising individual artificial muscles operable to either expand or contract is embedded in the virtual reality glove and the individual artificial muscles are actuated in response to an event in the virtual reality environment such that a user wearing the virtual reality glove experiences resistance to virtual objects simulating a resistance the user would feel from a tangible object.

In one embodiment, the present invention includes a virtual reality (VR) glove including a power supply, at least one processor, at least one memory, and a plurality of artificial muscles, wherein each artificial muscle of the plurality of artificial muscles includes at least one sensor and at least one flexible sheet, wherein the at least one flexible sheet is a concave shape, wherein the at least one sensor includes a gyroscope, a magnetic field sensor, an acoustic sensor, a light emitting sensor, and/or a light reflecting sensor, wherein the plurality of artificial muscles are configured to increase stiffness or decrease stiffness, wherein the at least one processor is configured to receive at least one signal from at least one remote device, wherein the at least one processor is further configured to transmit a stimulus across the plurality of artificial muscles based on the at least one signal, wherein the plurality of artificial muscles are configured to expand or contract based on the stimulus, wherein a stiffness of the plurality of artificial muscles increases when contracted and the stiffness of the plurality of artificial muscles decreases when expanded, and wherein the VR glove is configured to push and/or pull on a back of a hand of a user, a finger of the user, a fingertip of the user, and/or a palm of the user.

In another embodiment, the present invention includes a virtual reality (VR) system including a virtual reality (VR) glove, and at least one remote device, wherein the VR glove includes a power supply including a rechargeable battery, at least one processor, at least one memory, at least one sensor, a plurality of twisted artificial muscles, wherein each twisted artificial muscle of the plurality of twisted artificial muscles include a fiber, wherein the fiber is twisted to create a coil, wherein the plurality of twisted artificial muscles further include a material including a degree of internal alignment, wherein the at least one remote device is configured to generate a virtual reality environment, wherein the VR glove and the at least one remote device are in network communication, wherein the VR glove is configured to transmit sensor data to the at least one remote device, wherein the VR glove corresponds to a hand of a virtual avatar in the virtual reality environment, wherein the at least one processor is configured to receive at least one activation signal from the at least one remote device, wherein the at least one processor is configured to transmit a stimulus to at least one twisted artificial muscle of the plurality of twisted artificial muscles based on the at least one activation signal, wherein the at least one activation signal corresponds to activity performed in the virtual reality environment, and wherein the hand of the virtual avatar is configured to match the movement of the at least one twisted artificial muscle of the plurality of twisted artificial muscles.

In yet another embodiment, the present invention included a virtual reality (VR) system including at least one remote device, a virtual reality environment, and a virtual reality (VR) glove, wherein the VR glove includes a power supply, at least one processor, and at least one memory, a plurality of artificial muscles, wherein each artificial muscle of the plurality of artificial muscles includes at least one sensor and at least one flexible sheet, a first scaffolding positioned on a palm side of the VR glove, a second scaffolding positioned on a back side of the VR glove, wherein the first scaffolding and the second scaffolding are configured to not move when the plurality of artificial muscles expand or contract, wherein the at least one flexible sheet is a concave shape, wherein the at least one sensor includes a gyroscope, a magnetic field sensor, an acoustic sensor, an light emitting sensor, and/or a light reflecting sensor, wherein the at least one sensor is configured to capture motion data, wherein the at least one sensor is configured to transmit the motion data to the at least one remote device, wherein the at least one remote device is configured to modify the virtual reality environment based on the motion data, wherein the at least one remote device is configured to transmit a first activation signal to the at least one processor based on the modification of the virtual reality environment, wherein the at least one processor is configured to apply a first stimulus to the plurality of artificial muscles based on the first activation signal, wherein the plurality of artificial muscles are configured to contract or expand based on the first stimulus, wherein the at least one remote device is configured to transmit a second activation signal based on the modification of the virtual reality environment, wherein the at least one processor is configured to apply a second stimulus to the plurality of artificial muscles based on the second activation signal, and wherein the plurality of artificial None of the prior art discloses a virtual reality glove including artificial muscles. Additionally, none of the prior art discloses providing a pull and/or push on fingers or on the palm of a hand.

With the growth of the virtual reality business, there has arisen a need to provide tactile feedback to users interacting with virtual reality objects. While virtual reality headsets allow a user to see three-dimensional virtual objects, additional devices are still required to manipulate these three-dimensional virtual objects. Virtual reality gloves fill this role and have the added benefit of compatibility with any type of virtual reality technology-whether a virtual reality headset or a hologram is used to display a virtual reality environment, a virtual reality glove may be used to interact with that environment.

Prior art virtual reality gloves are classified into three groups: traditional gloves, thimbles, and exoskeletons. Traditional gloves are fabric gloves with haptic motors installed. Thimble gloves refer to those with actuators placed on fingertips, which pinch the fingertips in response to an event in a virtual reality environment. Finally, exoskeletons refer to structures which a user wears over the back of their hand that transmits force to the fingers by pulling back on a user's fingertips.

Regarding traditional gloves which comprise haptic motors, often these motors merely vibrate or buzz in response to an event in the virtual reality environment. While the buzz or vibration of these gloves does alert a user that they are in contact with a virtual object, a buzz or vibration will not be mistaken for contact with a tangible object. There is, for example, no force to physically restrain the user from moving their hand through the virtual object.

Regarding the thimble-type gloves, these merely provide a pinching sensation in response to an event in a virtual reality environment, which will not be mistaken for touching a tangible object any more than the buzz or vibration of traditional gloves will.

Regarding the virtual reality gloves that take the form of exoskeletons, these devices exert a restricting force on the user's fingers to prevent the fingers from moving through a virtual object. The exoskeleton virtual reality glove does not accurately simulate the sensation of touching a tangible object because it does not have as many degrees of freedom as a real hand and because the way that this glove exerts force on fingers is by pulling back on fingertips, which is not the same sensation that a finger experiences when the finger touches an object.

Prior art virtual reality gloves also have problems with fit. If a glove that uses haptic motors is too large, there is empty space between the vibrating motor and the user's hand which prevents the user from experiencing the haptic feedback. Exoskeletons gloves limit the user from making certain hand gestures or movements. Virtual reality gloves made with artificial muscles do not have these problems because the artificial muscles are operable to extend to meet the user's hand and because artificial muscles are flexible enough to not get in a user's way. In addition, due to 3D printing artificial muscles, a virtual reality glove can be manufactured that perfectly fits a user's hand.

Furthermore, prior art virtual reality gloves are difficult to clean. If a user is wearing a virtual reality glove for extended periods of time, then the user's hands sweat inside the glove, which requires the glove to be cleaned. However, due to the electronics of prior art virtual reality gloves, these gloves are difficult to clean. In one embodiment, the present invention comprises an antibacterial and/or water-resistant material.

The present invention advantageously provides for a virtual reality glove that includes artificial muscles rather than traditional actuators. These artificial muscles are able to respond to an event in a virtual reality environment to realistically simulate the sensation of touching a tangible object because the artificial muscles are operable to push and/or pull on a user's fingers, fingertips, palm, and/or back of a hand instead of merely pulling back on fingertips as exoskeleton gloves do. Furthermore, the artificial muscles are much lighter than traditional actuators, which means that a user's sense of immersion in a virtual reality environment will not be disrupted by continuously feeling a heavy weight on the user's hands. The light weight of the artificial muscles also allows a user to continue to use the virtual reality glove for a longer period of time without becoming fatigued. As an additional advantage of the present invention, the artificial muscles allow for finer motion and increased dexterity when compared to the pneumatic actuators or mechanical brakes of an exoskeleton virtual reality glove. Artificial muscles have smoother motions when compared to pneumatic actuators or mechanical brakes, which allows them to more closely mimic the natural motions of a human hand. The artificial muscles also allow the virtual reality glove to have an increased number of degrees of freedom when compared to prior art exoskeleton gloves, allowing the virtual reality glove to closer approximate the movements of a human hand.

Referring now to the drawings in general, the illustrations are for the purpose of describing one or more preferred embodiments of the invention and are not intended to limit the invention thereto.

Virtual Reality Environment

A virtual reality (VR) environment is a computer-generated, three-dimensional simulacrum of the world. A user views the VR environment through a digital display on a virtual reality headset. Virtual reality headsets either connect to another electronic device for processing or are standalone devices with their own internal processing. Virtual reality headsets include OCULUS RIFT, HTC VIVE, PLAYSTATION VR, GOOGLE CARDBOARD, SAMSUNG GEAR VR, OSVR, FOVE, MICROSOFT HOLOLENS, META, and others.

While virtual reality is linked to video games in the minds of many people due to the technology's origins, virtual reality has applications in architecture, art, cinema, medicine, and more. Virtual reality can be used to train assembly line workers, to visualize skylines, to give virtual tours of museums or tourist attractions, to train surgeons, and for many other purposes.

Virtual reality technology is also used to insert digital objects into the real world, which is often called mixed reality or augmented reality. In one embodiment, the VR environment is a pure VR environment and does not include features from the real world. In another embodiment, the VR environment is a mixed reality or augmented reality environment and does include features from the real world.

Virtual Reality Glove

One feature of a VR environment is that a user is able to interact with the environment by moving their head to change their field of view, by manipulating VR objects, and/or by other means. A virtual reality glove is one tool or interface that a user can use to interact with a VR environment.

A virtual reality glove is a device worn on a user's hand which enables the user to interact with objects in the virtual reality environment. Virtual reality gloves are wirelessly linked or are connected by wire to a VR headset and/or to a computer device. VR gloves are tracked by means of sensors which allows the gloves to be represented in the virtual environment. In one embodiment, the virtual reality glove is configured to connect to a VR headset. The virtual reality glove and VR headset are in network communication. In another embodiment, the VR headset and the virtual reality glove correspond to an avatar in the virtual reality environment.

In one embodiment, the virtual reality glove includes a power supply, control electronics, at least one sensor, and a plurality of artificial muscles including a flexible sheet. The power supply includes at least one rechargeable battery. Alternatively, the power supply includes at least one non-rechargeable battery. The control electronics are configured to transmit signals to and receive signals from the virtual reality glove and at least one remote device. In one embodiment, the at least one remote device includes a television, a mobile device, a computer, a virtual reality system, and other similar remote devices. In one embodiment, the control electronics receive an activation signal from the at least one remote device to activate the virtual reality glove. The control electronics transmit a stimulus to the plurality of artificial muscles, thereby, causing the plurality of artificial muscles to expand or contract. The at least one sensor is operable to provide positioning data of the virtual reality glove. For example, and not limitation, the at least one sensor is configured to track the motion of the virtual reality glove and transmit the positioning data to the at least one remote device. Advantageously, this enables the at least one remote device to modify a virtual reality environment based on changes in the positioning data of the virtual reality glove. The control electronics are further operable to selectively activate at least one artificial muscle of the plurality of artificial muscles. For example, and not limitation, if a virtual reality environment provides for a simulation of a user playing a piano, then the virtual reality glove is configured to selectively apply a stimulus to the artificial muscle(s) corresponding to the finger or fingers pressing one or more piano keys. This enables a user to practice in real-time, even if the user does not own a piano.

The control electronics preferably have at least one processor. By way of example, and not limitation, the processor includes a general-purpose microprocessor (e.g., a central processing unit (CPU)), a graphics processing unit (GPU), a microcontroller, a Digital Signal Processor (DSP), an Application Specific Integrated Circuit (ASIC), a Field Programmable Gate Array (FPGA), a Programmable Logic Device (PLD), a controller, a state machine, gated or transistor logic, discrete hardware components, or any other suitable hardware or combinations thereof that can perform calculations, process instructions for execution, and/or other manipulations of information. In one embodiment, one or more of the at least one processor is operable to run predefined programs stored in at least one memory of the control electronics.

The control electronics preferably include at least one antenna, which allows the control electronics to receive and process input data (e.g., temperature settings, virtual reality settings) from at least one remote device (e.g., smartphone, tablet, laptop computer, desktop computer, remote control).

In a preferred embodiment, the at least one remote device is in wireless network communication with the control electronics. The wireless communication is, by way of example and not limitation, radiofrequency, BLUETOOTH®, ZIGBEE®, WI-FI®, wireless local area networking, near field communication (NFC), or another similar commercially utilized standard. Alternatively, the at least one remote device is in wired communication with the control electronics through Universal Serial Bus (USB) or equivalent.

In one embodiment, the at least one processor is a microcontroller. The microcontroller includes a transceiver, a BLUETOOTH module, a WI-FI module, a microprocessor, an ultra-low-power co-processor, read-only memory (ROM), random-access memory (RAM) (e.g., static random-access memory (SRAM)), flash memory, a power management unit, a temperature sensor, and/or a digital-to-analog converter.

The control electronics enable the virtual reality glove to respond to an event within a virtual reality environment. The virtual reality glove comprises a plurality of artificial muscles which respond to the event within the virtual reality environment. Virtual reality gloves comprise actuators which respond to the event within the virtual reality environment. In one embodiment, the event is the virtual representation of the virtual reality glove coming into contact with a virtual object. As the virtual reality glove comes into contact with a virtual object, the control electronics of the virtual glove are configured to receive an activation signal from at least one remote device. The activation signal includes a command indicating which artificial muscle or group of artificial muscles to activate based on the contact of the virtual representation of the virtual glove with the virtual object in the virtual reality environment. The VR glove is further configured to transmit a stimulus across the artificial muscle or a plurality of artificial muscles based on the activation signal. Thus, the artificial muscles of the VR glove are operable to exert force on a user's hand in order to simulate the sensation of touching a real object. For example, if a user wearing a VR glove was to move the VR glove such that the representation of the VR glove in the VR environment was to come into contact with a virtual object, the artificial muscles of the VR glove exerts a force on the user's fingers, fingertips, palm, and/or a back of the user's hand to simulate contact of the user's hand with the object and to prevent the user's hand from moving the representation of the VR glove through the virtual object. In one embodiment, the artificial muscles provide for the VR glove to mimic the stiffness of the virtual object, providing more resistance when the virtual object represents a hard, rigid object like a brick and providing less resistance if the virtual object represents a soft object like a pillow. In one embodiment, the artificial muscles of the VR glove provide for a feeling of increased resistance as a user grips a virtual representation of an object with the virtual representation of the VR glove more tightly or firmly.

FIG. 1 illustrates a virtual reality glove according to one embodiment of the present invention. The virtual reality glove 100 includes sensors 102 and a flexible sheet 104. The sensors comprise inertial positioning systems, magnetic positioning systems, optical positioning systems, acoustic positioning systems, and/or other positioning systems. In another embodiment, the sensors include pressure sensors, temperature sensors, global positioning sensors, and/or orientation sensors. Inertial positioning systems rely on gyroscopes, but errors quickly accumulate in these systems. It is common to use inertial positioning systems in combination with another kind of sensor that repeatedly corrects the inertial positioning system. Magnetic positioning systems track the movement of sensors through a magnetic field by measuring the electromotive force induced in the sensors by the field. Magnetic systems are highly accurate, but operate only at short ranges. Optical positioning systems operate on the same principles as human vision. Acoustic positioning systems operate by means of acoustic signals and have good accuracy but high latency. In one embodiment, the virtual reality glove is tracked by means of inertial positioning systems, magnetic positioning systems, optical positioning systems, acoustic positioning systems, and/or combinations thereof.

In another embodiment, cameras are used to calculate the location of an object in 3D space. In one embodiment, the cameras are located on a virtual reality headset. In another embodiment, the cameras are externally located base stations and are independently placed surrounding a user. In yet another embodiment, the cameras are operable to identify active or passive sensors located on an object of interest. In another embodiment, the cameras are operable to track objects even without the aid of active or passive sensors by identifying distinctive points and tracking how the distinctive points move. In one embodiment, an active sensor emits light. In another embodiment, a passive sensor reflects light. In yet another embodiment, the camera includes a motion sensor camera and is configured to capture the movement of the virtual reality glove. The captured motion data is used to determine a corresponding activity in the virtual reality environment. For example, and not limitation, if the motion capture data indicates that the fingers of the virtual reality glove are curling, then the at least one remote device is configured to curl the virtual hands of an avatar. The at least one remote device is further operable to determine whether a user is attempting to pick up a virtual object and to send a signal to the virtual reality glove to apply a force to the user's hand in response to the virtual representation of the user's hands contacting the virtual object. For example, in one embodiment, the user attempts to pick up a stone in the virtual reality environment, but the stone is too heavy to lift with one hand. Therefore, the virtual reality glove is configured to limit the movement of the user's hand, until a user uses a second hand in the virtual reality environment which is linked to a second virtual reality glove on the user's other hand to lift the virtual stone. This force feedback provides for simulating real-world interactions.

In another embodiment, the virtual reality glove includes an inertial measurement unit (IMU) comprising a gyroscope, an accelerometer, and a magnetic sensor. The IMU is configured to determine a degree of freedom orientation of the virtual reality glove in real-time. The at least one remote device is further configured to activate the plurality of artificial muscles based on the orientation of the virtual reality glove. For example, and not limitation, a virtual reality environment is operable to determine that the virtual reality glove is in an downward orientation. The virtual reality environment is further configured to simulate a vertical force on the hand by activating the plurality of artificial muscles so the user feels an upward pull on their hand.

Virtual reality gloves use haptic actuators which vibrate, pneumatic actuators or mechanical brakes on exoskeletons, artificial muscles, or other kinds of actuators. In one embodiment, the actuators are artificial muscles. Artificial muscles provide significant advantages over traditional haptic actuators and pneumatic actuators. When compared to traditional haptic vibrators, artificial muscles provide a much more realistic feeling of coming into contact with an object. The vibration of a haptic vibrator does not resist the movement of a user's hand, so a user will not mistake a buzz or vibration for touching a physical object. While the pneumatic actuators or mechanical brakes on an exoskeleton glove exert a restricting force onto a user's fingertips, this also does not accurately simulate a sensation of touching a tangible object because the exoskeleton glove does not have as many degrees of freedom as a real hand and because the way that the exoskeleton glove exerts force on fingers is by pulling back on the fingers, which is not the same as the sensation that a finger experiences when the finger touches an object.

Virtual reality gloves made with artificial muscles provide for a realistic simulation of touching tangible objects. In one embodiment, artificial muscles are integrated into a virtual reality glove such that the virtual reality glove is configured to push on the front of a user's fingertips and hand instead of merely pulling on the back, thereby providing a sensation closer to that actually experienced when touching a tangible object.

In one embodiment, as shown in FIG. 1, the virtual reality glove comprises a flexible sheet 104 attached to a palm of the glove. The flexible sheet 104 is concave such that it follows the contour of a human hand, and is covered with a plurality of artificial muscles along the surface of the flexible sheet 104 facing away from the glove. In one embodiment, the artificial muscles are integrated with the flexible sheet 104 or a fabric from which the glove is formed. The plurality of artificial muscles are operable to extend, offering resistance to a user's fingers, fingertips, and/or a palm of a hand. The plurality of artificial muscles allow the virtual reality glove to simulate touching objects with uneven surfaces or with small features. In one embodiment, the virtual reality glove with artificial muscles has a resolution of 1 mm.

Figure 2:
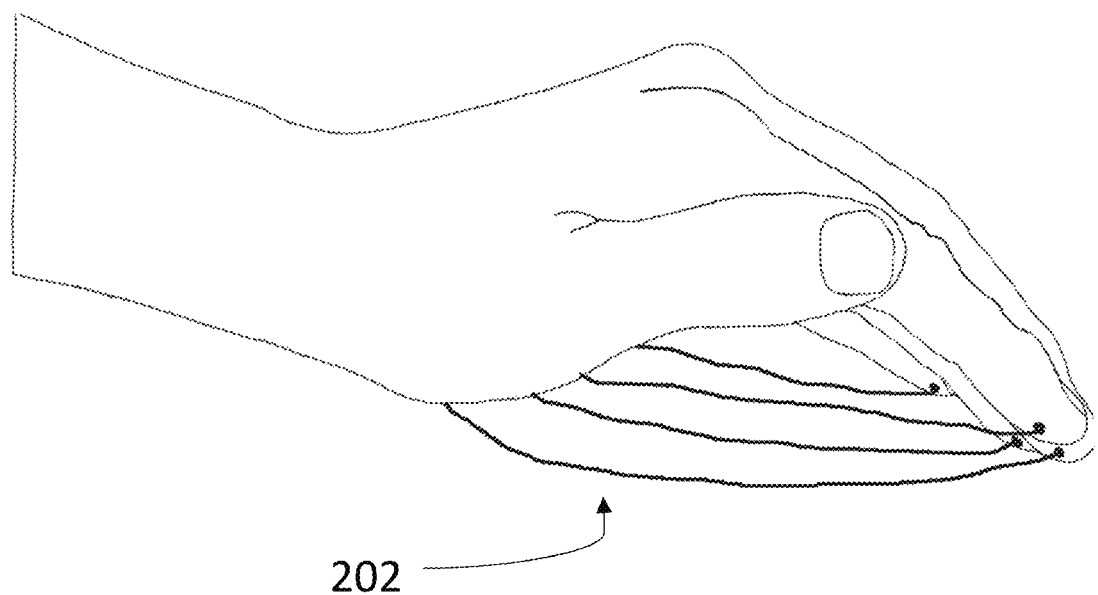
FIG. 2 illustrates an alternate embodiment of the present invention wherein the virtual reality glove comprises a plurality of twisted artificial muscles forming a net or webbing within the palm of the glove.

In one embodiment, as shown in FIG. 2, the virtual reality glove comprises a plurality of twisted artificial muscles forming a net or webbing 202 within the palm of the glove. The artificial muscles are operable to stiffen in order to offer resistance to a user's hand and/or fingers, simulating the sensation of touching an object. By stiffening artificial muscles in varying combinations, the virtual reality glove can simulate touching objects of variable shapes. For example, and not limitation, the virtual reality glove is configured to simulate grabbing a basketball, a football, a baseball, and other similar sports equipment. The virtual reality glove is configured to increase the stiffness of the plurality of twisted artificial muscles for the basketball in comparison to the baseball because the basketball is substantially larger in size than the baseball, and does not allow as much contraction of the glove with the basketball compared to the baseball since the basketball is substantially larger in size than the baseball.

Figure 3:
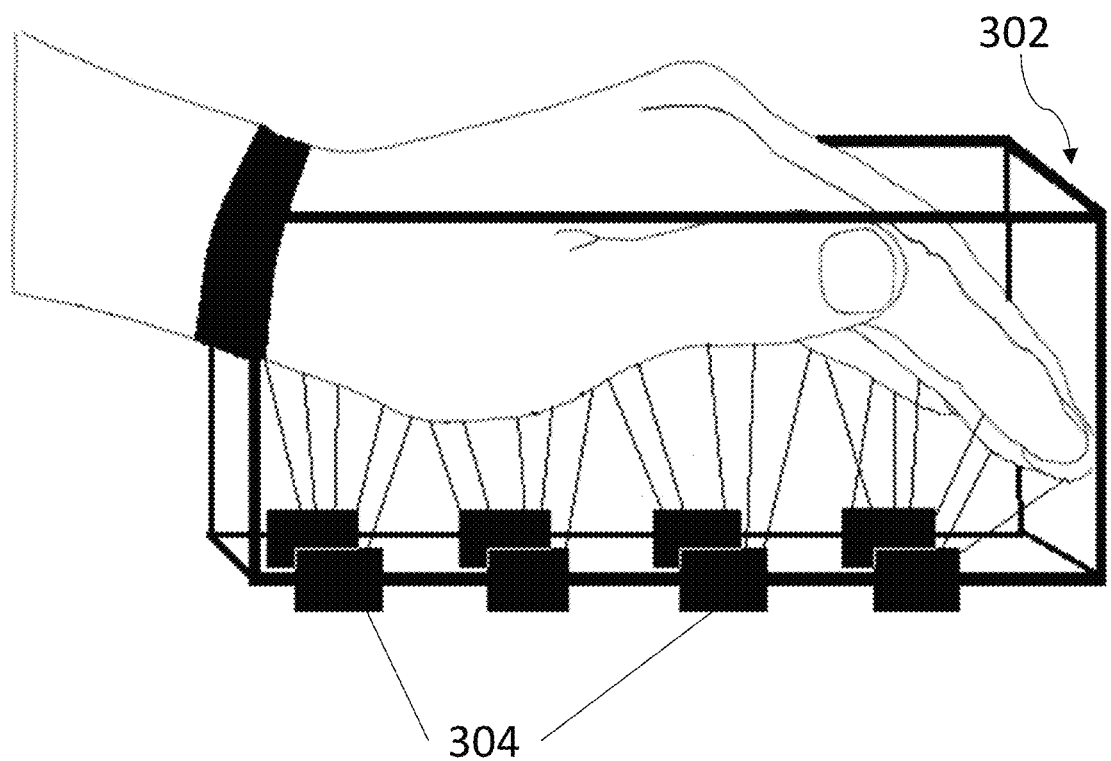
FIG. 3 illustrates another embodiment of the present invention wherein the virtual reality glove comprises a scaffolding surrounding the glove.

In another embodiment, as shown in FIG. 3, the virtual reality glove comprises a scaffolding 302 surrounding the glove. The scaffolding comprises a plurality of anchor points 304, and a plurality of artificial muscles extend from the anchor points to fingers, fingertips, and a palm of the glove. The scaffolding is stiff such that the scaffolding does not move when one of the plurality of artificial muscles attached to it extends or contracts. In a further embodiment the virtual reality glove comprises a second scaffolding on a back of the glove. In yet another embodiment, the entire virtual reality glove is surrounded by scaffolding.

Figure 4:
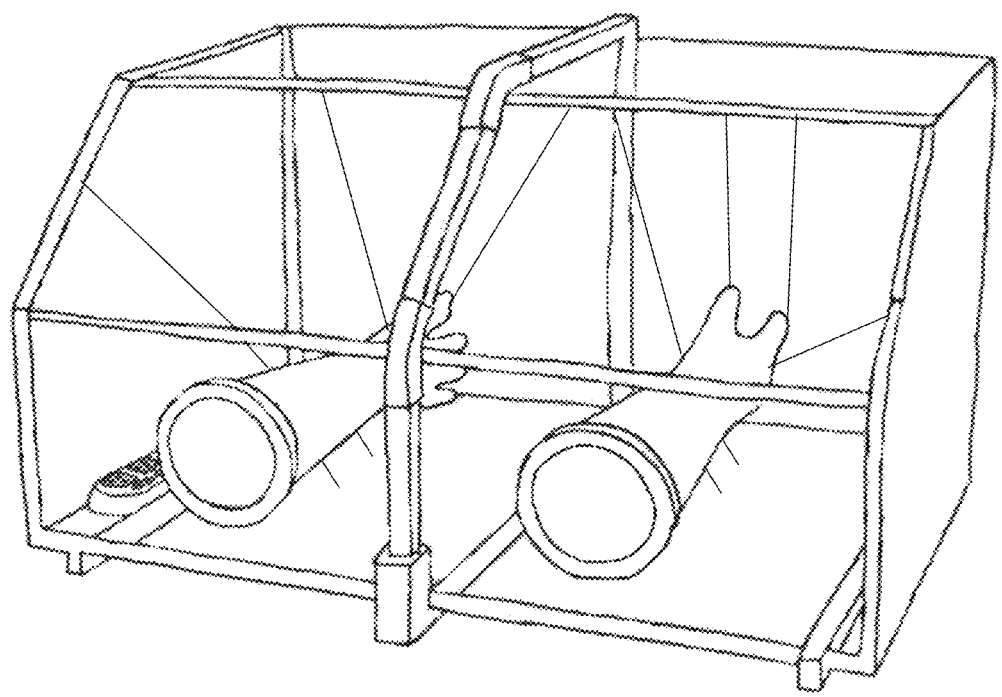
FIG. 4 illustrates yet another embodiment of the present invention wherein the virtual reality glove is completely enclosed in a glove box.

In another embodiment, as shown in FIG. 4, the virtual reality glove is completely enclosed in a glove box. A plurality of artificial muscles extends from the walls of the box and connects to the virtual reality glove, such that the plurality of artificial muscles is operable to push or pull on the virtual reality glove from any angle. In one embodiment, the glovebox is transparent. In another embodiment, the glovebox is opaque.

Figure 5:
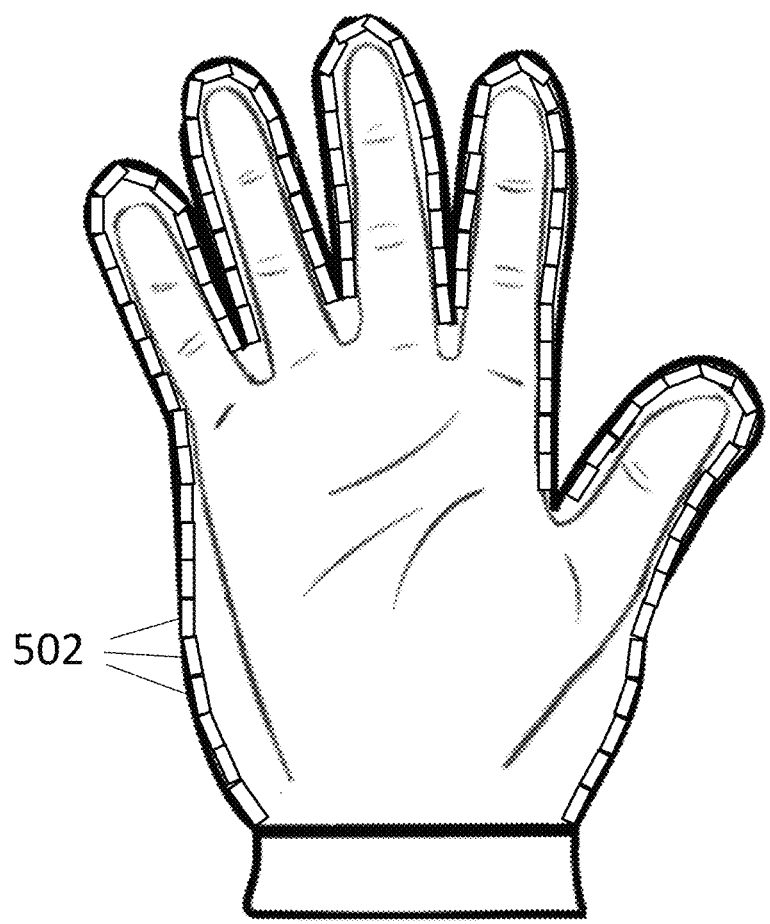
FIG. 5 illustrates an embodiment of the present invention wherein the virtual reality glove comprises a solid glove comprised of electroactive artificial muscles.

In another embodiment, as shown in FIG. 5, the virtual reality glove comprises a solid glove comprised of electroactive artificial muscles 502. The artificial muscles completely wrap around a user's hand, and are operable to expand or contract to exert force on the user's hand from any direction. This embodiment also allows for simulation of sensations such as immersing a hand in a substance. In one embodiment, the virtual reality glove includes ionic polymer-metal composites (IPMC) and a dielectric elastomer electroactive polymer (EAP). The IPMCs enables the virtual reality glove to bend and the dielectric EAP enables the virtual reality glove to move in a linear fashion. Together the VR glove is configured to simultaneously move in both linearly and bending motions. For example, and not limitation, the VR glove is configured to perform extension movement, flexion movement, adduction movement, abduction movement, pronation movement, and/or supination movement.

In a further embodiment, the virtual reality glove is partially 3D printed. A 3D printer is operable to print layers of electroactive polymers, which allows for the construction of artificial muscles in varying thicknesses and shapes. These artificial muscles are then embedded into a virtual reality glove. In another embodiment, the entire virtual reality glove is 3D printed. The virtual reality glove is printed as a single piece, or in the alternative, in a plurality of separate pieces that are attached together. 3D printing of a virtual reality glove is advantageous both because it lowers manufacturing costs and because it allows for the glove to be manufactured to custom specifications. In one embodiment, a consumer's hand is scanned and a virtual reality glove is 3D printed to match the dimensions of the consumer's hand.

In another embodiment, the virtual reality glove comprises a 3D printed block of artificial muscle with a cavity for a user to insert their hand into. The artificial muscle surrounds the hand on every side and can push on the hand from any angle. In one embodiment the 3D printed block is a single piece, in an alternate embodiment the 3D printed block comprises a top piece and a bottom piece with a cavity in between.

In another embodiment, the virtual reality glove comprises two sets of artificial muscles in a pattern mirroring the attachment of muscles in a human hand, one set on a palm side of the virtual reality glove and a second set on a back side of the virtual reality glove. In an alternate embodiment the set of artificial muscles on the back side of the virtual reality glove is omitted.

The weight of a virtual reality glove is an important consideration, because the lower the weight of the glove, the less a user notices the glove, allowing the user to become immersed in a virtual reality environment. Artificial muscles are lighter than traditional actuators. In one embodiment, a virtual reality glove made with artificial muscles weighs less than one pound. In a further embodiment, a virtual reality glove weighs less than half of a pound. In yet a further embodiment, a virtual reality glove weighs less than a quarter of a pound. The light weight of the artificial muscles, in addition to heightening a user's sense of immersion, allows the user to continue to wear the virtual reality gloves for longer without becoming fatigued.

Virtual reality gloves made with artificial muscles provide for finer motion and increased dexterity when compared to exoskeleton virtual reality gloves. Artificial muscles have smoother motions when compared to traditional pneumatic actuators or mechanical brakes, which allows them to more closely mimic the movements and forces on a human hand. Furthermore, virtual reality gloves made with artificial muscles allow the glove to have a large number of degrees of freedom. The human hand has 27 degrees of freedom: four in each finger, except for the thumb which has five, and six for the rotation and translation of the wrist. In one embodiment, a virtual reality glove made with artificial muscles has at least 21 degrees of freedom. In a further embodiment, the virtual reality glove has 27 degrees of freedom.

Twisted Artificial Muscles

Figure 6:
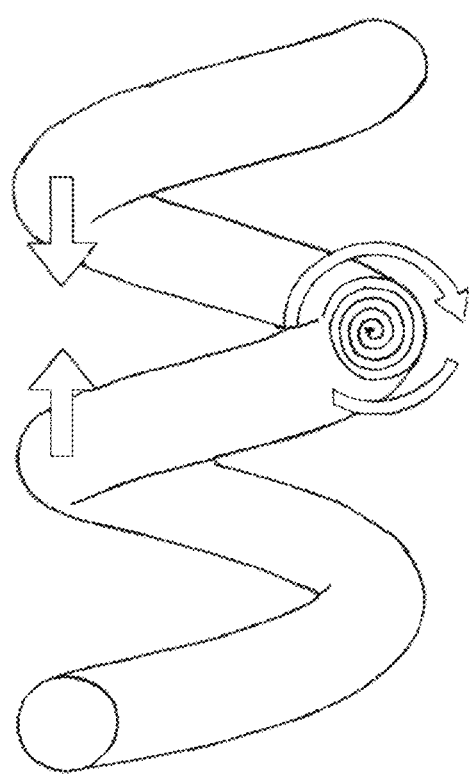
FIG. 6 illustrates an artificial muscle contracting by means of an untwisting string or fiber bringing the coils closer together.

A twisted artificial muscle is a string or fiber that has been twisted to such a degree that it spontaneously forms coils. When a string or fiber begins to twist, the string or fiber first begins to store rotational or torsional potential energy. As twisting continues, the string or fiber begins to loop into coils. FIG. 6 shows a string or fiber twisted or coiled in this way.

A twisted artificial muscle is comprised of a material that has a degree of internal alignment. Internal alignment means that the material is stretched along a fiber direction, giving the material anisotropy. Due to the stretching and resulting anisotropy, a coefficient of thermal expansion of the material along a length direction is less than a coefficient of thermal expansion of the material along a radial direction. A coefficient of thermal expansion is a measure of expansion of a material as a function of temperature. In most materials, as the material increases in temperature, its molecules gain kinetic energy and move further away from each other. In anisotropic materials, the degree to which the material expands as a function of heat is different in different directions. Due to the differences in the coefficients of thermal expansion, the string or fiber reversibly untwists when subjected to a stimulus, which either brings the coils closer together, contracting the artificial muscle, or pushes the coils apart, extending the artificial muscle, depending on coiling method. The coils are therefore operable to either expand or contract along a length axis of the string or fiber in response to a stimulus, making the artificial muscle a tensile actuator. In one embodiment, the material is any fiber with internal alignment. In another embodiment, the material comprises carbon nanotubes, cyclic olefin copolymer elastomers, polyethylene, nylon, and/or combinations thereof. In a further embodiment, a wax is embedded in the material.

Figure 7:
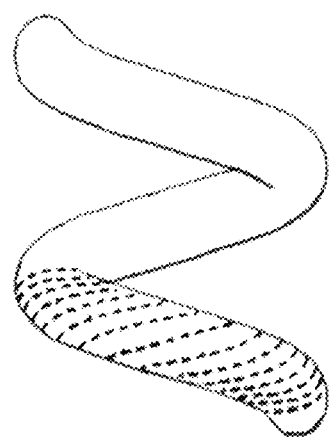
FIG. 7 illustrates a homochiral artificial muscle.
Figure 8:
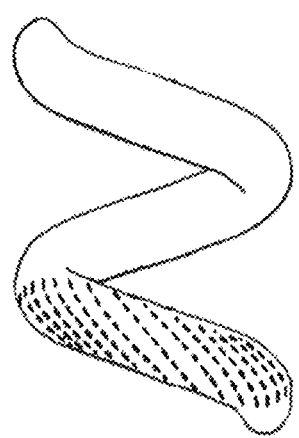
FIG. 8 illustrates a heterochiral artificial muscle.

A twisted artificial muscle is either homochiral or heterochiral. A homochiral artificial muscle, as shown in FIG. 7, is an artificial muscle where the string or fiber has been coiled in the same direction that the string or fiber has been twisted. A homochiral artificial muscle will shrink or contract when subjected to stimulus. A heterochiral artificial muscle, as shown in FIG. 8, is an artificial muscle where the string or fiber has been coiled in the opposite direction that the string or fiber has been twisted. A heterochiral artificial muscle will expand when subjected to stimulus.

The behavior of a twisted artificial muscle is controlled by the Twist Equation:

$$\Delta L = l^2 * \Delta T / N$$

Where $\Delta L$ is the change in length;
Where $\Delta T$ is the change in twist;
Where $N$ is the number of coils;
And where $l$ is the length of filament making up the coils.

The equation is of use in understanding the behavior of the twisted artificial muscle. In a homochiral artificial muscle, as the string or fiber is subjected to stimulus and begins to untwist due to differing coefficients of thermal expansion along different axes, the decrease in T (twist) means that L (length) must decrease as well. As the string or fiber untwists, the coils in the artificial muscle pull closer together, contracting the artificial muscle. In a heterochiral artificial muscle the same untwist of the string or fiber increases T, which means that L must increase as well and push the coils further apart.

There is a negative correlation between a diameter of a coil in a twisted artificial muscle and the twisted artificial muscle's power. If the twisted artificial muscle comprises tight coils with a smaller diameter, then the twisted artificial muscle will have a higher power but a lower stroke. On the other hand, if the twisted artificial muscle comprises coils that are larger in diameter, then the twisted artificial muscle will have lower power but a greater stroke. Stroke is a measure of the contraction or expansion of a twisted artificial muscle; a greater stroke means that the twisted artificial muscle expands or contracts to a greater degree.

Twisted artificial muscles are scale invariant, which means that they are easily scalable. In one embodiment, the twisted artificial muscle has a tensile stroke of at least 30%. In a further embodiment, the tensile stroke is at least 60%. In another embodiment, the twisted artificial muscle exhibits no hysteresis. In another embodiment, the twisted artificial muscle is operable to undergo at least a million cycles before degrading.

Twisted artificial muscles are stronger than natural muscles, and in one embodiment can deliver at least 2,000 J/kg of specific work.

Twisted artificial muscles expand or contract along a length axis in response to a stimulus. In one embodiment, the stimulus is thermal. When a twisted artificial muscle is heated, the increase in heat causes the string or fiber to expand. Due to the differing coefficients of thermal expansion, the expansion of the string or fiber by heat causes the string or fiber to untwist. As the string or fiber untwists, the twisted artificial muscle will contract if it is homochiral or will expand if it is heterochiral.

In another embodiment, the stimulus is electrical. Electrical energy flowing through a twisted artificial muscle is converted into thermal energy due to electrical resistance of the artificial muscle. The thermal energy causes the twisted artificial muscle to expand or contract due to the differing coefficients of thermal expansion.

In yet another embodiment, the stimulus is the addition of a solvent. As the artificial muscle absorbs the solvent, it swells in size. Similar to how the twisted artificial muscle exhibits anisotropic thermal expansion, the twisted artificial muscle also exhibits anisotropic swelling. The anisotropic swelling causes the twisted artificial muscle to untwist.

The effect of the stimulus on stroke can be amplified by providing the twisted artificial muscle with a sheath. Without a sheath, energy is applied to the entire artificial muscle, but the interior is not responsible for much of the work. By contrast, once a sheath is added, the interior need not have energy applied to it—the sheath can receive the majority of the energy and perform the majority of the work. A sheath is added by dissolving a sheath polymer in a solvent and then coating the dissolved sheath polymer onto a twisted string or fiber. Then, the string or fiber is coiled before the sheath polymer dries. In one embodiment, the sheath polymer comprises poly(ethylene oxide), tetrafluoroethylene, sulphonyl fluoride vinyl ether, polyurethane, carbon nanotubes, and/or combinations thereof.

Electroactive Artificial Muscle

Electroactive artificial muscles, also known as electroactive polymers or dielectric artificial muscles, are in effect stacks of capacitors that change capacitance by compressing or expanding. When a voltage difference is applied across the capacitor, the capacitor compresses in thickness and expands in area—the capacitor converts electrical energy to mechanical energy by bringing the opposing charges closer together. By stacking a plurality of these capacitors, an artificial muscle is constructed that will shrink along the stack's height axis when a voltage difference is applied. In another embodiment, rather than stacking capacitors to use the compression in thickness, a capacitor is instead rolled into a hollow cylinder. When a voltage difference is applied to the capacitor, the capacitor will expand in area, which has the effect of extending the cylinder in length. In this way, dielectric artificial muscles are operable to be used either for expansion or for compression.

Dielectric artificial muscles require high voltages but low electrical power. Dielectric artificial muscles comprise electrostrictive, electrostatic, piezoelectric, and ferroelectric polymers.

Dielectric artificial muscles have energy densities comparable to typical mammalian muscles, and have slightly higher strokes. In one embodiment, the dielectric artificial muscle has an energy density of 19.8 J/kg. In another embodiment, the dielectric artificial muscle has a stroke of about 24%.

Ionic Artificial Muscle

Ionic artificial muscles are actuated by the displacement of ions within the muscle in response to an electric field. Ionic artificial muscles require lower voltages but higher electrical power. Ionic artificial muscles require an electrolyte and need to be kept wet in order to work. In one embodiment, the ionic artificial muscles are immersed in fluid and are sealed within a flexible tube. Ionic artificial muscles comprise carbon nanotubes, electrorheological fluids, ionic polymer gels, ionic polymer metallic composites, and conductive polymers.

Pneumatic Artificial Muscle

Pneumatic artificial muscles compress or expand by means of a pneumatic bladder. A pneumatic bladder is located inside of a fiber weave that forms a thin membrane. When pressurized air or liquid is forced into the bladder, it expands, forcing the thin membrane outwards. In one embodiment, the pressurized air and/or liquid is forced into the bladder by means of a compressed air generator. The force of a pneumatic artificial muscle is thus dependent on the tightness of the membrane, the state of inflation of the bladder, and on the pressure of the air or liquid. Furthermore, because pneumatic artificial muscles have a nonlinear force-length relationship, they are easier to control than traditional pneumatics.

The artificial muscle is a twisted artificial muscle, an electroactive artificial muscle, an ionic artificial muscle, a pneumatic artificial muscle, any other kind of artificial muscle, and/or combinations thereof.

Applications

The level of resolution of the virtual reality glove depends on the particular application of the glove. For example, and not limitation, if a virtual reality glove is designed to be used in connection with a video game for a young child, the level of resolution required might be low. In one embodiment, the virtual reality glove is configured for children's games and only requires enough resolution to pick up and maneuver blocks or other simple shapes. By lowering the resolution of the virtual reality glove, the cost of manufacture and thus the resultant price to consumers is decreased as well. On the other hand, a virtual reality glove designed to be used in connection with training or used as a controller for manufacturing equipment requires a greater degree of resolution. For applications such as remote surgery, where precision is required, the highest level of resolution is provided. In one embodiment, the level of resolution of a virtual reality glove is changed during the manufacturing process by adjusting the number and density of artificial muscles.

Virtual reality gloves are operable to be used in connection with educational games, video games, historical reproductions, physics simulations, esports, virtual sports, athletics training, simulations for skilled professions, remote manufacturing, remote surgery, interacting with any other virtual reality environment, and/or combinations thereof.

In one embodiment, the virtual reality glove is configured to change the amount of dexterity that the virtual reality glove provides to a user based on the location of the virtual reality glove. Advantageously, this enables the virtual reality glove to conserve power, as enabling more dexterity for the virtual reality glove typically uses more power than providing a lesser degree of dexterity. In one embodiment, the virtual reality glove includes a position sensor and is configured for use in a hospital. The position sensor is operable to communicate with location sensors positioned throughout a hospital to determine what type of work the virtual reality glove will be used to perform. For example, and not limitation, the virtual reality glove is configured to receive a signal that it is in the neurosurgery section of a hospital. The virtual reality glove is then configured to increase its dexterity and degrees of freedom in response to the signal. The virtual reality glove is further configured to receive a signal when the virtual reality glove is no longer positioned in the neurosurgery section of the hospital. The virtual reality glove is then configured to decrease its dexterity, thereby reducing its power requirements.

In yet another embodiment, the present invention further includes a mobile application displayed via a graphical user interface (GUI) of the at least one remote device. The mobile application is configured to provide the battery status of the virtual reality glove, to generate an alert when the virtual reality gloves fails to function, to modify at least one setting of the virtual reality glove (e.g. stiffness levels), and to modify at least one setting of a virtual reality environment.

In another embodiment, the virtual reality glove is configured to work with an Internet of Things (IoT) device. The IoT device includes wearables such as smart glasses. The IoT device is operable to receive instructions from a remote device and to translate those instructions to controls for the virtual reality glove. For example, and not limitation, a user is practicing on a real piano and using the virtual reality glove and the IoT device. The IoT device is operable to capture a user playing the piano and to receive feedback relating to the captured user data. The feedback includes finger placement. The IoT device is then further operable to identify which finger of the virtual reality glove the user needs to move to correct their playing. The IoT device is configured to send a signal to the virtual reality glove to activate the artificial muscle corresponding to the appropriate finger of the virtual reality glove. Advantageously, this enables a user to get real-time feedback when practicing an instrument.

In yet another embodiment, the virtual reality glove includes a thermoelectric component. The thermoelectric component is configured to receive a stimulus from the control electronics to provide a heating or cooling effect to a user. Advantageously, this increases the immersion of a user in the virtual reality environment because the virtual reality glove is configured to simulate hot and cold environments. In yet another embodiment, the virtual reality glove is configured to monitor the temperature of a wearer. The virtual reality glove is configured to transmit the temperature of the wearer to the virtual reality environment and a second virtual reality device (e.g., a virtual reality headset). The virtual reality environment is configured to change based on the temperature of the wearer. For example, and not limitation, when the temperature of a user increases, the virtual reality environment is configured to display sweat on a virtual reality avatar corresponding to the virtual reality glove.

Computer System

Figure 9:
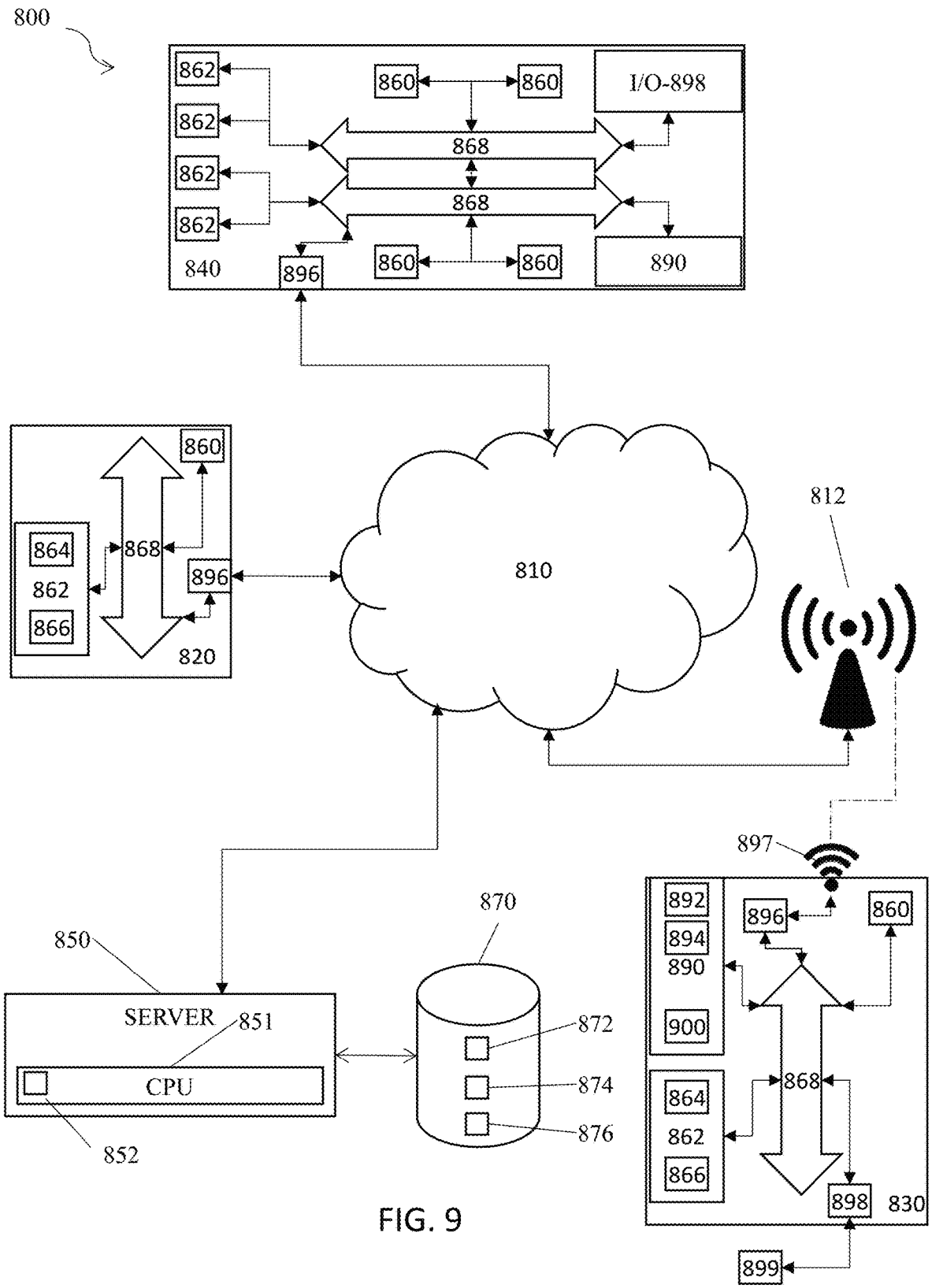
FIG. 9 is a schematic diagram of a system of the present invention.

FIG. 9 is a schematic diagram of an embodiment of the invention illustrating a computer system, generally described as 800, having a network 810, a plurality of computing devices 820, 830, 840, a server 850, and a database 870.

The server 850 is constructed, configured, and coupled to enable communication over a network 810 with a plurality of computing devices 820, 830, 840. The server 850 includes a processing unit 851 with an operating system 852. The operating system 852 enables the server 850 to communicate through network 810 with the remote, distributed user devices. Database 870 is operable to house an operating system 872, memory 874, and programs 876.

In one embodiment of the invention, the system 800 includes a network 810 for distributed communication via a wireless communication antenna 812 and processing by at least one mobile communication computing device 830. Alternatively, wireless and wired communication and connectivity between devices and components described herein include wireless network communication such as WI-FI, WORLDWIDE INTEROPERABILITY FOR MICROWAVE ACCESS (WIMAX), Radio Frequency (RF) communication including RF identification (RFID), NEAR FIELD COMMUNICATION (NFC), BLUETOOTH including BLUETOOTH LOW ENERGY (BLE), ZIGBEE, Infrared (IR) communication, cellular communication, satellite communication, Universal Serial Bus (USB), Ethernet communications, communication via fiber-optic cables, coaxial cables, twisted pair cables, and/or any other type of wireless or wired communication. In one embodiment, the communication is 5G or quantum communication. In another embodiment of the invention, the system 800 is a virtualized computing system capable of executing any or all aspects of software and/or application components presented herein on the computing devices 820, 830, 840. In certain aspects, the computer system 800 is operable to be implemented using hardware or a combination of software and hardware, either in a dedicated computing device, or integrated into another entity, or distributed across multiple entities or computing devices.

By way of example, and not limitation, the computing devices 820, 830, 840 are intended to represent various forms of electronic devices including at least a processor and a memory, such as a server, blade server, mainframe, mobile phone, personal digital assistant (PDA), smartphone, desktop computer, netbook computer, tablet computer, workstation, laptop, and other similar computing devices. The components shown here, their connections and relationships, and their functions, are meant to be exemplary only, and are not meant to limit implementations of the invention described and/or claimed in the present application.

In one embodiment, the computing device 820 includes components such as a processor 860, a system memory 862 having a random access memory (RAM) 864 and a read-only memory (ROM) 866, and a system bus 868 that couples the memory 862 to the processor 860. In another embodiment, the computing device 830 is operable to additionally include components such as a storage device 890 for storing the operating system 892 and one or more application programs 894, a network interface unit 896, and/or an input/output controller 898. Each of the components is operable to be coupled to each other through at least one bus 868. The input/output controller 898 is operable to receive and process input from, or provide output to, a number of other devices 899, including, but not limited to, alphanumeric input devices, mice, electronic styluses, display units, touch screens, signal generation devices (e.g., speakers), or printers.

By way of example, and not limitation, the processor 860 is operable to be a general-purpose microprocessor (e.g., a central processing unit (CPU)), a graphics processing unit (GPU), a microcontroller, a Digital Signal Processor (DSP), an Application Specific Integrated Circuit (ASIC), a Field Programmable Gate Array (FPGA), a Programmable Logic Device (PLD), a controller, a state machine, gated or transistor logic, discrete hardware components, or any other suitable entity or combinations thereof that can perform calculations, process instructions for execution, and/or other manipulations of information.

In another implementation, shown as 840 in FIG. 9, multiple processors 860 and/or multiple buses 868 are operable to be used, as appropriate, along with multiple memories 862 of multiple types (e.g., a combination of a DSP and a microprocessor, a plurality of microprocessors, one or more microprocessors in conjunction with a DSP core).

Also, multiple computing devices are operable to be connected, with each device providing portions of the necessary operations (e.g., a server bank, a group of blade servers, or a multi-processor system). Alternatively, some steps or methods are operable to be performed by circuitry that is specific to a given function.

According to various embodiments, the computer system 800 is operable to operate in a networked environment using logical connections to local and/or remote computing devices 820, 830, 840 through a network 810. A computing device 830 is operable to connect to a network 810 through a network interface unit 896 connected to a bus 868. Computing devices are operable to communicate communication media through wired networks, direct-wired connections or wirelessly, such as acoustic, RF, or infrared, through an antenna 897 in communication with the network antenna 812 and the network interface unit 896, which are operable to include digital signal processing circuitry when necessary. The network interface unit 896 is operable to provide for communications under various modes or protocols.

In one or more exemplary aspects, the instructions are operable to be implemented in hardware, software, firmware, or any combinations thereof. A computer readable medium is operable to provide volatile or non-volatile storage for one or more sets of instructions, such as operating systems, data structures, program modules, applications, or other data embodying any one or more of the methodologies or functions described herein. The computer readable medium is operable to include the memory 862, the processor 860, and/or the storage media 890 and is operable be a single medium or multiple media (e.g., a centralized or distributed computer system) that store the one or more sets of instructions 900. Non-transitory computer readable media includes all computer readable media, with the sole exception being a transitory, propagating signal per se. The instructions 900 are further operable to be transmitted or received over the network 810 via the network interface unit 896 as communication media, which is operable to include a modulated data signal such as a carrier wave or other transport mechanism and includes any delivery media. The term "modulated data signal" means a signal that has one or more of its characteristics changed or set in a manner as to encode information in the signal.

Storage devices 890 and memory 862 include, but are not limited to, volatile and non-volatile media such as cache, RAM, ROM, EPROM, EEPROM, FLASH memory, or other solid state memory technology; discs (e.g., digital versatile discs (DVD), HD-DVD, BLU-RAY, compact disc (CD), or CD-ROM) or other optical storage; magnetic cassettes, magnetic tape, magnetic disk storage, floppy disks, or other magnetic storage devices; or any other medium that can be used to store the computer readable instructions and which can be accessed by the computer system 800.

In one embodiment, the computer system 800 is within a cloud-based network. In one embodiment, the server 850 is a designated physical server for distributed computing devices 820, 830, and 840. In one embodiment, the server 850 is a cloud-based server platform. In one embodiment, the cloud-based server platform hosts serverless functions for distributed computing devices 820, 830, and 840.

In another embodiment, the computer system 800 is within an edge computing network. The server 850 is an edge server, and the database 870 is an edge database. The edge server 850 and the edge database 870 are part of an edge computing platform. In one embodiment, the edge server 850 and the edge database 870 are designated to distributed computing devices 820, 830, and 840. In one embodiment, the edge server 850 and the edge database 870 are not designated for distributed computing devices 820, 830, and 840. The distributed computing devices 820, 830, and 840 connect to an edge server in the edge computing network based on proximity, availability, latency, bandwidth, and/or other factors.

It is also contemplated that the computer system 800 is operable to not include all of the components shown in FIG. 9, is operable to include other components that are not explicitly shown in FIG. 9, or is operable to utilize an architecture completely different than that shown in FIG. 9. The various illustrative logical blocks, modules, elements, circuits, and algorithms described in connection with the embodiments disclosed herein are operable to be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application (e.g., arranged in a different order or partitioned in a different way), but such implementation decisions should not be interpreted as causing a departure from the scope of the present invention.

The above-mentioned examples are provided to serve the purpose of clarifying the aspects of the invention, and it will be apparent to one skilled in the art that they do not serve to limit the scope of the invention. By nature, this invention is highly adjustable, customizable and adaptable. The above-mentioned examples are just some of the many configurations that the mentioned components can take on. All modifications and improvements have been deleted herein for the sake of conciseness and readability but are properly within the scope of the present invention.

The invention claimed is:

1. A virtual reality (VR) glove comprising:
a power supply;
at least one processor;
a plurality of artificial muscles; and
a scaffolding;
wherein the at least one processor is configured to transmit a stimulus across the plurality of artificial muscles;
wherein the plurality of artificial muscles are configured to expand or contract based on the stimulus;
wherein a stiffness of the plurality of artificial muscles increases when contracted and the stiffness of the plurality of artificial muscles decreases when expanded; and
wherein the scaffolding surrounds the VR glove, wherein the scaffolding is configured to not move when the plurality of artificial muscles contract or expand.

2. The VR glove of claim 1, wherein the plurality of artificial muscles include a plurality of twisted artificial muscles.

3. The VR glove of claim 2, wherein each twisted artificial muscle of the plurality of twisted artificial muscles include a fiber, wherein the fiber is twisted to create a coil.

4. The VR glove of claim 1, wherein the plurality of artificial muscles include a plurality of electroactive artificial muscles.

5. The VR glove of claim 1, wherein the plurality of artificial muscles are positioned between each finger of the VR glove, on a back side of each finger of the VR glove, or on a palm side of each finger of the VR glove.

6. The VR glove of claim 1, wherein the VR glove is configured to push or pull on a back of a hand of a user, a finger of the user, a fingertip of the user, or a palm of the user.

7. The VR glove of claim 1, wherein the VR glove is configured for at least 21 degrees of freedom.

8. The VR glove of claim 1, wherein each artificial muscle of the plurality of artificial muscles includes at least one flexible sheet.

9. The VR glove of claim 1, further comprising a thermoelectric component, wherein the at least one processor is configured to activate the thermoelectric component, wherein the thermoelectric component is configured to apply a heating effect or a cooling effect to the VR glove.

10. A virtual reality (VR) glove comprising:
a power supply;
at least one processor;
a plurality of twisted artificial muscles, wherein each twisted artificial muscle of the plurality of twisted artificial muscles include a fiber;
wherein the plurality of twisted artificial muscles further include a material including a degree of internal alignment;
wherein the plurality of twisted artificial muscles include a tensile stroke of at least 30%;
wherein the at least one processor is configured to transmit a stimulus to at least one twisted artificial muscle of the plurality of twisted artificial muscles.

11. The VR glove of claim 10, wherein the material includes carbon nanotubes, cyclic olefin copolymer, elastomers polyethylene, or nylon.

12. The VR glove of claim 10, wherein the plurality of twisted artificial muscles are homochiral.

13. The VR glove of claim 10, wherein the plurality of twisted artificial muscles are heterochiral.

14. The VR glove of claim 10, wherein the fiber is twisted to create a coil.

15. The VR glove of claim 10, further including a sheath around the plurality of twisted artificial muscles.

16. A virtual reality (VR) glove comprising:
a power supply;
at least one processor; and
a plurality of artificial muscles;
a first scaffolding positioned on a palm side of the VR glove;
a second scaffolding positioned on a back side of the VR glove;
wherein the first scaffolding and the second scaffolding are configured to not move when the plurality of artificial muscles expand or contract; and
wherein the plurality of artificial muscles are configured to contract or expand based on a stimulus applied by the at least one processor.

17. The VR glove of claim 16, wherein the first scaffolding further includes a first plurality of anchor points, wherein the second scaffolding further includes a second plurality of anchor points, wherein the plurality of artificial muscles are configured to expand from the first plurality of anchor points and the second plurality of anchor points to the fingers, fingertips, and palm of the VR glove.

18. The VR glove of claim 16, wherein the at least one processor is further configured to activate at least one artificial muscle of the plurality of artificial muscles in response to a first stimulus, wherein the at least one processor is further configured to activate a different artificial muscle of the plurality of artificial muscles based on a second stimulus.

19. The VR glove of claim 16, wherein the VR glove is configured to push or pull on a back of a hand of a user, a finger of the user, a fingertip of the user, or a palm of the user.

* * * * *